United States Patent
Chakrabarti

(10) Patent No.: US 6,640,224 B1
(45) Date of Patent: Oct. 28, 2003

(54) SYSTEM AND METHOD FOR DYNAMIC INDEX-PROBE OPTIMIZATIONS FOR HIGH-DIMENSIONAL SIMILARITY SEARCH

(75) Inventor: Soumen Chakrabarti, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,501

(22) Filed: Feb. 4, 2000

Related U.S. Application Data

(63) Continuation-in-part of application No. 08/990,292, filed on Dec. 15, 1997, now Pat. No. 6,389,436.

(51) Int. Cl.$^7$ ............................ G06F 17/30; G06F 7/00
(52) U.S. Cl. ............................... 707/5; 707/2; 707/102
(58) Field of Search .................................. 707/1–5, 102

(56) References Cited

U.S. PATENT DOCUMENTS

| | | | | |
|---|---|---|---|---|
| 5,463,773 A | * | 10/1995 | Sakakibara et al. | 707/102 |
| 5,625,767 A | * | 4/1997 | Bartell et al. | 707/5 |
| 5,835,905 A | * | 11/1998 | Pirolli et al. | 707/3 |
| 5,873,056 A | * | 2/1999 | Liddy et al. | 704/9 |
| 5,895,470 A | * | 4/1999 | Pirolli et al. | 707/102 |
| 5,960,422 A | * | 9/1999 | Prasad | 707/2 |
| 5,983,170 A | * | 11/1999 | Goodman | 704/9 |
| 6,055,540 A | * | 4/2000 | Snow et al. | 707/103 R |
| 6,094,653 A | * | 7/2000 | Li et al. | 707/6 |
| 6,101,515 A | * | 8/2000 | Wical et al. | 707/531 |
| 6,125,361 A | * | 9/2000 | Chakrabarti et al. | 707/3 |
| 6,182,058 B1 | * | 1/2001 | Kohavi | 706/45 |
| 6,233,575 B1 | * | 5/2001 | Agrawal et al. | 707/6 |
| 6,266,664 B1 | * | 7/2001 | Russell-Falla et al. | 707/5 |
| 6,286,018 B1 | * | 9/2001 | Pitkow et al. | 707/513 |
| 6,334,131 B2 | * | 12/2001 | Chakrabarti et al. | 707/10 |
| 6,336,112 B2 | * | 1/2002 | Chakrabarti et al. | 707/5 |
| 6,356,899 B1 | * | 3/2002 | Chakrabarti et al. | 707/5 |
| 6,389,436 B1 | * | 5/2002 | Chakrabarti et al. | 707/513 |
| 2001/0037324 A1 | * | 11/2001 | Agrawal et al. | 707/1 |

OTHER PUBLICATIONS

Cohen, W.W. and Singer, Y. "Context–Sensitive Learning Methods for Text Categorization", ACM Transactions on Information Systems, vol. 17, No. 2, Apr. 1999, pp. 141–173.*

Pirolli, P., Pitkow, J. and Rao, R. "Silk from a Sow's Ear: Extracting Usable Structures from the Web", Proceedings of the Conference on Human Factors and Computing Systems (CHI96), Apr. 1996.*

Chakrabarti, S. "Focused Crawling: The Quest for Topic-–Specific Portals", undated, downloaded from www.cs.berkeley.edu/~soumen/focus on May 2, 2002, 3 pages.*

Chakrabarti, S. "Recent Results in Automatic Web Resource Discovery", ACM Computing Surveys, vol. 31, No. 4, Dec. 1999, 7 pages.*

Chakrabarti, S. et al. "Mining the Web's Link Structure", Computer, vol. 32, No. 8, Aug. 1999, pp. 60–67.*

Chakrabarti, S. et al. "Distributed Hypertext Resource Discovery Through Examples", Proceedings of the 25th Very Large Database Conference, Sep. 7–10, 1999, pp. 375–386.*

(List continued on next page.)

Primary Examiner—Jean R. Homere
Assistant Examiner—Luke S Wassum
(74) Attorney, Agent, or Firm—John L. Rogitz

(57) ABSTRACT

A system and method for optimizing I/O to low-level index access during bulk-routing through a taxonomy to classify documents, e.g., Web pages, in the taxonomy. In a first optimization, bulk-routing is regarded as a generalized join operation in a relational database framework. In a second optimization, instead of processing each document individually through nodes of the taxonomy, a group of documents are processed node by node in a wavefront-style routing scheme for better amortization of index probes.

19 Claims, 2 Drawing Sheets

OVERALL FLOW

OTHER PUBLICATIONS

Chakrabarti, S. "Hypertext Databases and Data Mining", Proceedings of the 1999 ACM SIGMOD International Conference on Management of Data, Jun. 1999, pp. 508.*

Chakrabarti, S. et al. "Focused Crawling: A New Approach to Topic–Specific Web Resource Discovery", Proceedings of the $8^{th}$ International World Wide Web Conference, May 1999, 17 Pages.*

Chakrabarti, S. et al. "Scalable Feature Selection, Classification and Signature Generation for Organizing Large Text Databases into Hierarchical Topic Taxonomies", The VLDB Journal, vol. 7, Aug. 1998, pp. 163–178.*

Chakrabarti, S. et al. "Enhanced Hypertext Categorization Using Hyperlinks", Proceedings of the 1998 ACM SIGMOD International Conference on Management of Data, Jun. 1998, pp. 307–318.*

Chakrabarti, S. et al. "Automatic Resource Compilation by Analyzing Hyperlink Structure and Associated Text", Proceedings of the $7^{th}$ World Wide Web Conference, Apr. 14–18, 1998, 10 pages.*

Dumais, S. et al. "Inductive Learcning Algorithms and Representations for Text Categorization", Proceedings of the $7^{th}$ Conference on Information and Knowledge Managament, 1998, 8 pages.*

Chakrabarti, S. et al. "Using Taxonomy, Discriminants, and Signatures for Navigating in Text Databases", Proceedings of the $23^{rd}$ Very Large Database Conference, Aug. 25–29, 1997, pp. 446–455.*

Koller, D. and Sahami, M. "Hierarchically Classifying Documents Using Very Few Words", Proceedings of the $14^{th}$ International Conference on Machine Learcning, Jul. 1997, pp. 170–178.*

Cohen, W.W. "Fast Effective Rule Induction", Proceedings of the $12^{th}$ International Conference on Machine Learning, 1995, 9 pages.*

* cited by examiner

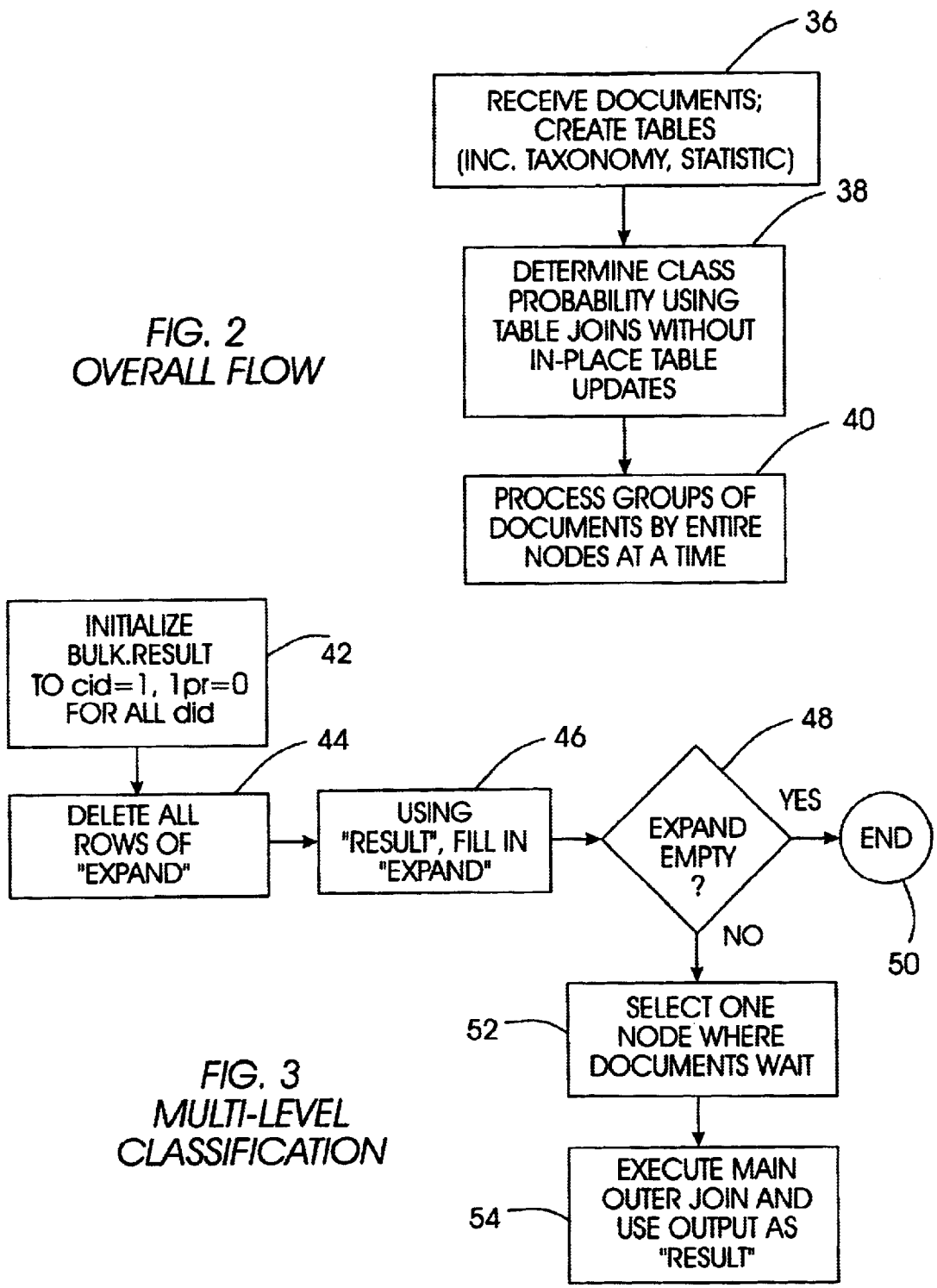

SYSTEM AND METHOD FOR DYNAMIC INDEX-PROBE OPTIMIZATIONS FOR HIGH-DIMENSIONAL SIMILARITY SEARCH

This application is a continuation-in-part of U.S. patent application Ser. No. 08/990,292, filed Dec. 15, 1997, now U.S. Pat. No. 6,389,436 for an invention entitled "Enhanced Hypertext Categorization Using Hyperlinks", from which priority is claimed and which is incorporated herein by reference.

BACKGROUND OF THE INVENTION

1. Field of the Invention

The present invention relates generally to high-dimensional similarity searches, and more particularly to methods for classifying a large number of Web documents in a Web taxonomy.

2. Description of the Related Art

High-dimensional search is an important operation in multimedia databases that contain text documents, audio, and video. To facilitate such searching, database objects can be classified in a taxonomy that has a tree-like structure. For illustration, text documents are used herein as examples of such database objects, it being understood that the present invention applies equally to other genre of objects.

In developing a classification taxonomy, supervised learning can be used, wherein a few training documents initially are assigned to the various nodes of a taxonomy and subsequent documents are then classified based on comparisons with the training documents. Generally, a document will be classified at a leaf node in a taxonomy when the leaf node contains training documents that are "closest" to the document sought to be classified. For example, in so-called Bayesian classifiers, each node "c" (also referred to herein as a "class" or "classification") in a taxonomy tree has an associated document model that is defined by the training documents. When a test document "d" is to be classified, a posterior probability that measures the likelihood that the test document "d" could have been generated by the class "c", denoted Pr[c|d], is determined for each class "c". The test document is classified as belonging to the class "c" having the highest posterior probability for that document.

In undertaking the classification process, Bayesian classifiers collect term occurrences and estimate statistical parameters $\theta(c,t)$ which are measures of the fractional rate at which the term "t" occurs in the class "c". For large data sets, e.g., databases of Web pages, the parameters $\theta(c,t)$ cannot be cached entirely in local memory, but must instead be stored on, e.g., a disk or other storage device. As will be appreciated, data accesses to disks and other such storage devices consume a great deal of time, compared to data accesses to local memory.

Thus, in contrast to an index probe being routed down a so-called "B-Tree" or "R-Tree", the above-discussed high-dimensional classification search operation cannot cache the comparison data that is to be used at each node in memory. Instead, in the present high-dimensional application both the probe and the comparison models at each node are large complex objects, and each step in the classification decision process consequently requires an "outside" data access, typically to a disk. As recognized by the present invention, it would be advantageous to optimize such "outside" data accesses for the case of high-dimensional operations, particularly in contexts, such as classifying millions of Web pages, which require near-constant classification of a seemingly endless supply of large documents.

SUMMARY OF THE INVENTION

The invention is a general purpose computer programmed according to the inventive steps herein to classify documents in a taxonomy. The invention can also be embodied as an article of manufacture—a machine component—that is used by a digital processing apparatus and which tangibly embodies a program of instructions that are executable by the digital processing apparatus to undertake the logic disclosed herein. This invention is realized in a critical machine component that causes a digital processing apparatus to undertake the inventive logic herein.

In accordance with the present invention, the computer includes a data storage device including a computer usable medium having computer readable code means for document classification. The code means include computer readable code means for establishing plural data tables, with the data tables including a taxonomy table containing data related to a classification taxonomy. Also, one of the tables contains data representing statistics related to occurrences of terms in nodes of the taxonomy. Computer readable code means receive documents, and computer readable code means are provided for classifying the documents with respect to the taxonomy by undertaking at least one table join using the plural data tables and the document, such that data access is optimized.

In a preferred embodiment, the classifying means requires no random data input/output (I/O) access, nor does it require in-place table updates. In this way, redundant probes for terms that occur in many documents are eliminated.

In a particularly preferred embodiment, an inner table join and a left outer table join are executed by the classifying means. The table joins can be represented by the expression (using Bayesian notation) logprior[c]+$\Sigma_{t \in d \cap c}$freq[d,t](log$\theta$[c,t]+logdenom[c])−logdenom[c]$\Sigma_{t \in d}$freq[d,t], wherein d represents the document, t represents at least one term, and c represents a taxonomy.

To enhance the effectiveness of the above-summarized join operations, computer readable code means can process a group of documents using the means for classifying by testing all documents in the group at a test node in the taxonomy, prior to testing any document at a node other than the test node. Thus, entire taxonomy nodes at a time are processed. For such bulk processing, the data tables include an expand table and a result table, and the means for processing the group of documents recursively deletes rows in the expand table and fills the rows with entries from the result table. Moreover, the means for classifying executes a left outer table join, and the result table is populated by results from the left outer table join.

In another aspect, a computer system for wave-front classification processing of a group of documents relative to a taxonomy includes a computer including program structure that processes the group of documents by testing all documents in the group at a test node in the taxonomy, prior to testing any document at a node other than the test node.

In yet another aspect, a computer-implemented method is disclosed for classifying at least one group of documents with respect to a taxonomy while optimizing I/O access. The method includes establishing plural data tables including a taxonomy table containing data related to the taxonomy and a statistic table containing data representing statistics related to occurrences of terms in nodes of the taxonomy. Documents in the group of documents are classified with respect to the taxonomy by executing an inner table join and an outer table join. In accordance with present principles, at least one of the joins uses elements from the taxonomy table and the statistic table, and all documents in the group are tested at a test node in the taxonomy prior to testing any document at a node other than the test node.

In still another aspect, the above-summarized method is stored as a computer program on a computer program device. The program device includes a computer program storage device that is readable by a digital processing apparatus, and the program is on the program storage device. The program includes instructions that can be executed by the digital processing apparatus for performing the method steps of the present invention.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart showing the overall logic of the present invention; and

FIG. 3 is a flow chart showing the logic of the multi-level classification steps.

DETAILED DESCRIPTION OF THE PREFERRED EMBODIMENTS

Figure 1:
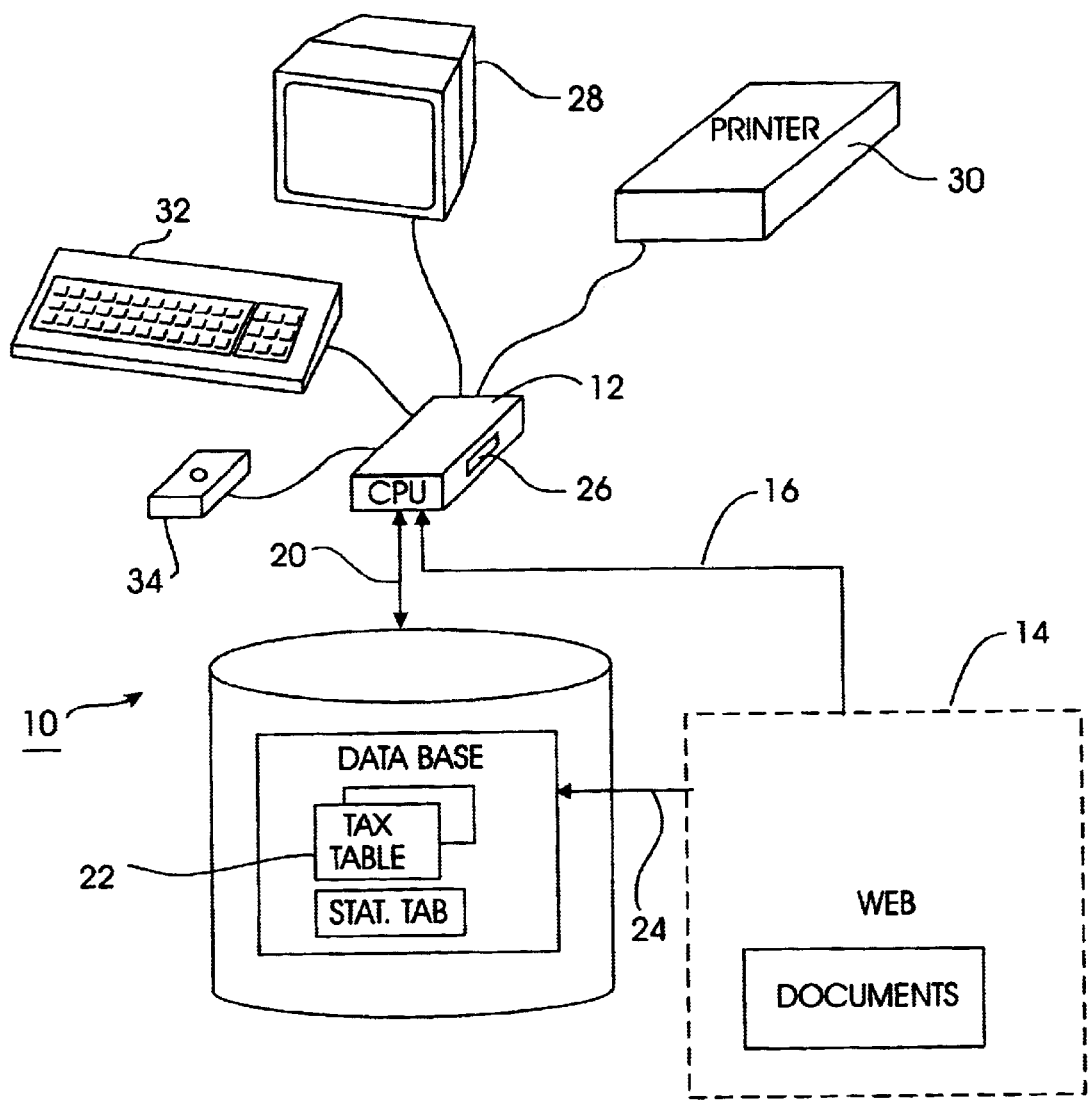
FIG. 1 is a schematic diagram of the present classification system.

Referring initially to FIG. 1, a system for document classification is shown, generally designated 10. In the particular architecture shown, the system 10 includes a digital processing apparatus, such as a computer 12, which can access the World Wide Web 14 via the Internet 16. Also, the computer 12 accesses a database 18 via a data path 20, it being understood that the data path 20 can be established by an internal computer bus, LAN, WAN, or other communication path. In any case, the database 18 can include plural tables 22 that in turn include information related to Web documents, as indicated by the data path 24. As intended by the present invention, however, the present classification system applies to documents (and, more generally, to "probes" including audio and video objects) that may not necessarily originate from the Web 14.

In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or OS/2 server, or Windows NT server, or IBM RS/6000 250 workstation with 128 MB of main memory running AIX 3.2.5., or an IBM laptop computer.

The computer 12 includes a classification module 26 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette having a data storage medium holding computer program code elements. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code. As yet another equivalent alternative, the logic can be embedded in an application specific integrated circuit (ASIC) chip or other electronic circuitry.

FIG. 1 also shows that the system 10 can include peripheral computer equipment known in the art, including output devices such as a video monitor 28 and printer 30 and input devices such as a computer keyboard 32 and mouse 34. Other output devices can be used, such as other computers, and so on. Likewise, input devices other than the keyboard 32 can be used, e.g., trackballs, keypads, touch screens, and voice recognition devices.

Now referring to FIG. 2, the process flow of the present invention can be seen. For convenience, Bayesian notation is used. Commencing at block 36, data structures in the form of classification tables are created. The SQL-represented tables below illustrate a preferred data structure.

The first of the preferred tables is a taxonomy table. An SQL representation of the topic taxonomy data structure is as follows:

```
create table bulk.tax (
    kcid        smallint    not null    primary key,
    pcid        smallint    not null,
    logprior    float       not null,
    logdenom    float       not null
);
``` wherein k=child node, p=parent node, c=class, t=term or token, d=document, id=identification; and wherein the field logprior for a row with kcid=c and pcid=$c_0$ (i.e., the class of the root node) is set equal to $\log|\{d \in c\}| - \log|\{d \in c_0\}|$, i.e., the fraction of training documents belonging to $c_0$ that also belong to class "c"; and wherein the field logdenom is set equal to log (N(parent (c))+$\Sigma_{d \in c}\Sigma_{t \in d}$n(d,t), roughly the log of the total count of terms in documents in the class, wherein N is the number of terms in the training lexicon at node parent (c).

As intended by the present invention, documents sought to be classified can be referred to as "test" documents and can be represented in one or more tables. A particularly preferred SQL representation of the test documents is shown in the following two tables:

```
create table bulk.doc (
    did     integer     not null    primary key,
    tcid    smallint    not null,
    foreign key (tcid) references bulk.tax(kcid)
);
```

Initially, test documents are scanned, tokenized, and entered into the following test table:

```
create table bulk.test_1 (
    did     integer     not null,
    foreign key (did) references bulk.doc (did),
    tid     integer     not null,
    freq    smallint    not null,
    primary key (tid, cid)
);
```

It is to be understood that the suffix "_1" represents that initially, the classification is at the root node. It is to be further understood that "freq" refers to the number of times a term appears in a document, denoted herein n(d,t).

Furthermore, a statistic table is provided as follows:

```
create table bulk.stat_1 (
    kcid        smallint        not null,
    foreign key (kcid) references bulk.tax (kcid),
    tid         integer         not null,
    logθ        float           not null,
    primary key (tid, kcid)
);
create index bulk.stat1x1 on bulk.stat1(tid);
``` wherein θ (theta) is a statistic mentioned previously.

After the tables are generated at block 36, the logic moves to block 38 of FIG. 2 to determine classification probabilities using table joins, without requiring in-place table updates. In undertaking this, the present invention recognizes that all document identifications (did), or all term identifications (tid), or even all class identifications (cid) may consume too much storage space for caching the identifications in memory. The present understands that nevertheless, it is desirable to reduce or eliminate random data input/output (I/O) accesses to disk. To address this problem by eliminating redundant probes for terms that occur in many documents, the present invention provides a scoring table having the form (did, kcid, logprob) as follows:

Assume (1) logprior[c]=logPr[c|parent(c)], wherein Pr[c|parent(c)] is the Bayesian posterior probability that a document d in a parent class parent(c) is also in the class c, and (2) logdenom[c]=logδ(c), wherein δ(c) is the Bayesian statistic for accounting for the case where a training term does not appear in a class "c" but nonetheless the class "c" is to be examined.

Ignoring normalization details for clarity of disclosure, the likelihood that a document "d" is in a class "c"=score[d,c] can be determined as follows. In understanding the following discussion, likelihoods of documents being in particular classes (denoted herein as score[d,c]) are determined with the following algorithm in mind.

$$score[d,c]=logprior[c]+\Sigma_{t \in d \cap c}freq[d,t]log\theta[c,t]-\Sigma_{t \in d, t \notin c}freq[d,t]logdenom[c].$$

The node "c" corresponding to the highest score[d,c] is the node at which the document is classified. Thus, in determining score[d,c], the logic classifies the document in the taxonomy. Recognizing, however, that the first sum above is a simple inner join, but the second sum would otherwise require updating a table in place (which is computationally expensive), the present invention reconfigures the above expression for score[d,c] as an inner join and a left outer join as follows:

$$score[d,c]=logprior[c]+\Sigma_{t \in d \cap c}freq[d,t](log\theta[c,t]+logdenom[c]) -logdenom[c]\Sigma_{t \in d}freq[d,t].$$

The above reconfigured formula can be expressed in SQL as follows:

```
with
partial ( did, cid, 1pr1 ) as
(select did, bulk.tax.kcid, sum(freq * logtheta + logdenom))
from bulkstat_<ecid>, bulk.test_<ecid>, bulk.tax
where bulk.stat_<ecid>.tid = bulk.test_<ecid>.tid
and bulk.tax.pcid = <ecid>
and bulk.stat_<ecid>.kcid = bulk.tax.kcid
group by did, bulk.tax.kcid),
```

```
doclen ( did, len ) as
(select did, sum(freq) from bulk.test_<ecid>
where tid in (select tid from bulk.feature_<ecid>)
group by did),
complete ( did, cid, lpr2 ) as
(select did, kcid, logprior – len * logdenom
from doclen, bulk.tax
where bulk.tax.pcid = 1)
-- left outer join:
select C.did, C.cid, C.lpr2 + coalesce(P.lpr1, 0)
from complete as C left outer join partial as P
on C.did = P.did and C.cid = P.cid;
```

In addition to the above optimization in which a left outer table join is used to classify a document, a bulk probe can also be used as indicated at block 40 of FIG. 2 in which a "best" path is taken down the taxonomy tree. In the bulk probe, rather than travsering the nodes of a taxonomy with a single document until the document reaches a leaf node, a set of documents is processed in bulk from node to node, in a wavefront style, to further enhance the effectiveness of the process undertaken at block 38 above. To record the progress of the bulk probe, a table bulk expand is created that has the following structure:

| did | integer | not null, |
|---|---|---|
| cid | smallint | not null, |
| len | smallint | not null |

For each document ("did"), the term "len" stores the value of $\Sigma_{t \in d}freq[d,t]$ and the term "cid" stores the current node from which the document will next find the best child node. Initially, all rows have a cid=1.

The first query at the root node is identical to the query preceding the left outer join shown above. However, rather than completely finish taxonomy traversal before classifying another document, the present invention processes entire taxonomy nodes at a time with plural documents. Expressed in SQL terms, the present bulk query is as follows:

```
with
partial ( did, cid, 1pr1 ) as
(select did, bulk.tax.kcid, sum(freq * logtheta + logdenom))
from bulk.stat_<ecid>,bulk.test_<ecid>, bulk.tax
where bulk.stat_<ecid>.tid = bulk.test_<ecid>.tid
and bulk.tax.pcid = <ecid>
and bulk.stat_<ecid>.kcid = bulk.tax.kcid
group by did, bulk.tax.kcid),
complete ( did, cid, lpr2 ) as
(select did, kcid, logprior – len * logdenom
from bulk.expand, bulk.tax where bulk.tax.pcid = <cid>
and bulk.expand.cid = <ecid>),
final ( did, cid, lpr) as
(select C.did, C.cid, C.lpr2 + coalesce(P.lpr1, 0)
from complete as C left outer join partial as P
on C.did = P.did and C.cid = P.cid),
best ( mdid, mlpr) as
(select did, max(lpr) from final group by did)
select did, cid from final, best where did = mdid and lpr = mlpr;
```

The result of the above bulk probe is used to update the table bulk.expand. An outer loop is then used to find a value of <ecid> such that there are documents remaining at <ecid>, and the process repeats.

Now referring to FIG. 3, to optimize multi-level classification in which the goal is to find the best matching leaf node for each document, additional state must be introduced to keep track of documents, because the present invention understands that under these conditions the documents behave asynchronously with respect to each other. The preferred method for keeping track of documents to optimize multi-level classification is to create a result table bulk.result having the following structure:

| | | |
|---|---|---|
| did | integer | not null, |
| cid | smallint | not null, |
| priømary key ( did, cid ), | | |
| lpr | float | not null. |

As shown at block 42 of FIG. 3, the result table bulk.result is initialized to cid=1 and 1pr=0 for all "did". Then the logic shown in Figure moves to block 44 to delete all rows of the expand table bulk.expand. Proceeding to block 46, using entries in the result table bulk.result, the expand table is filled in. Moving to decision diamond 48, the logic determines whether the expand table is empty, and if so (indicating that all documents have reached their highest probability leaf), the logic ends at state 50.

In contrast, if it is determined at decision diamond 48 that the expand table is not empty, the logic moves to block 52 to select one of the nodes at which documents remain to be processed further down the tree. Then, at block 54 the above-described main outer join is executed, with the output of the join being used to fill in the result table bulk.result. The process then loops back to block 44 as shown.

Preferably, a relational database management system (rdbms) is used because increasingly, large text repositories are stored in such databases. Also, using rdbms enables the use of triggers, which can be used for recomputing class statistics, customer notification, and so on. However, it is to be understood that the present invention applies not only to rdbms, but also to custom classifiers and indexing engines.

While the particular SYSTEM AND METHOD FOR DYNAMIC INDEX-PROBE OPTIMIZATIONS FOR HIGH-DIMENSIONAL SIMILARITY SEARCH as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A general purpose computer including a data storage device including a computer usable medium having computer readable code means for document classification, comprising:

computer readable code means for establishing plural data tables, the data tables including at least a taxonomy table containing data related to at least one classification taxonomy, at least one of the tables containing data representing statistics related to occurrences of terms in nodes of the taxonomy;

computer readable code means for receiving at least one document; and computer readable code means for classifying the document with respect to the taxonomy by undertaking at least one table join using the plural data tables and the document, such that data access is optimized.

2. The computer of claim 1, wherein the classifying means requires no random data input/output (I/O) access.

3. The computer of claim 1, wherein no in-place table update is required by the classifying means.

4. The computer of claim 1, wherein an inner table join and a left outer table join are executed by the classifying means.

5. The computer of claim 4, wherein the table joins can be represented by the expression logprior[c]+$\Sigma_{t \in d \cap c}$freq[d,t] (logθ[c,t]+logdenom[c])−logdenom[c]$\Sigma_{t \in d}$freq[d,t], wherein d represents the document, t represents at least one term, and c represents a taxonomy.

6. The computer of claim 1, wherein the receiving means receives at least one group of documents, and the computer further comprises:

computer readable code means for processing the group of documents using the means for classifying by testing all documents in the group at a test node in the taxonomy, prior to testing any document at a node other than the test node, such that entire taxonomy nodes at a time are processed.

7. The computer of claim 6, wherein the data tables include an expand table and a result table, and the means for processing the group of documents recursively deletes rows in the expand table and fills the rows with entries from the result table.

8. The computer of claim 7, wherein the means for classifying executes a left outer table join, the result table being populated by results from the left outer table join.

9. A computer-implemented method for classifying at least one group of documents with respect to a taxonomy while optimizing I/O access, comprising the acts of:

establishing plural data tables including at least a taxonomy table containing data related to the taxonomy and at least a statistic table containing data representing statistics related to occurrences of terms in nodes of the taxonomy;

classifying documents in the group of documents with respect to the taxonomy by executing an inner table join and an outer table join, at least one of the joins using elements from at least the taxonomy table and the statistic table, all documents in the group being tested at a test node in the taxonomy prior to testing any document at a node other than the test node.

10. The method of claim 9, wherein the classifying act requires neither random data input/output (I/O) access nor in-place table update.

11. The method of claim 9, wherein the table joins can be represented by the expression logprior[c]+$\Sigma_{t \in d \cap c}$freq[d,t] (logθ[c,t]+logdenom[c])−logdenom[c]$\Sigma_{t \in d}$freq[d,t], wherein d represents the document, t represents at least one term, and c represents a taxonomy.

12. The method of claim 9, wherein the data tables include an expand table and a result table, and the group of documents is processed by deleting rows in the expand table and filling the rows with entries from the result table.

13. The method of claim 12, wherein the result table is populated by results from the outer table join.

14. A computer program device comprising:

a computer program storage device readable by a digital processing apparatus; and a program on the program storage device and including instructions executable by the digital processing apparatus for performing method steps for classifying at least one group of documents with respect to a taxonomy, the method steps comprising the acts of:

establishing plural data tables including at least a taxonomy table containing data related to the taxonomy and at least a statistic table containing data representing statistics related to occurrences of terms in nodes of the taxonomy;

classifying documents in the group of documents with respect to the taxonomy by executing an inner table join and an outer table join using elements from at least the taxonomy table and the statistic table, the documents being processed in a wave-front relative to the taxonomy.

15. The device of claim 14, wherein all documents in the group are tested at a test node in the taxonomy prior to testing any document at a node other than the test node.

16. The device of claim 15, wherein the classifying act requires neither random data input/output (I/O) access nor in-place table update.

17. The device of claim 15, wherein the table joins can be represented by the expression $\text{logprior}[c] + \Sigma_{t \in d \cap c} \text{freq}[d,t] (\log\theta[c,t] + \text{logdenom}[c]) - \text{logdenom}[c] \Sigma_{t \in d} \text{freq}[d,t]$, wherein d represents the document, t represents at least one term, and c represents a taxonomy.

18. The device of claim 15, wherein the data tables include an expand table and a result table, and the group of documents is processed by deleting rows in the expand table and filling the rows with entries from the result table.

19. The device of claim 18, wherein the result table is populated by results from the outer table join.

* * * * *